United States Patent [19]

Oosterling

[11] Patent Number: 5,520,941
[45] Date of Patent: May 28, 1996

[54] METHOD FOR CONDITIONED STORAGE AND SALE OF PERISHABLE FOODSTUFFS

[75] Inventor: Pieter A. Oosterling, Nieuw-Vennep, Netherlands

[73] Assignee: Veroost Bedrijfsontwikkeling B.V., Vieuw-Vennep, Netherlands

[21] Appl. No.: 273,269

[22] Filed: Jul. 11, 1994

Related U.S. Application Data

[63] Continuation of Ser. No. 740,811, Aug. 6, 1991, abandoned.

[30] Foreign Application Priority Data

Aug. 10, 1990 [NL] Netherlands ............................ 9001804

[51] Int. Cl.$^6$ ........................................ B65B 31/02
[52] U.S. Cl. ...................... 426/232; 426/315; 426/316; 426/392; 426/414; 426/418; 426/383; 99/467; 99/468; 221/123; 53/502; 53/517
[58] Field of Search .......................... 99/467, 468, 537, 99/484, 357; 221/123, 129, 130, 131, 133, 150 A, 150 HC, 150 R, 474, 476; 312/236; 53/502, 517; 426/232, 315, 316, 392, 396, 414, 418, 383

[56] References Cited

U.S. PATENT DOCUMENTS

| | | | |
|---|---|---|---|
| 3,055,548 | 9/1962 | Allegri | 221/150 R |
| 3,122,748 | 2/1964 | Beebe, Jr. | 426/316 X |
| 3,360,382 | 12/1967 | Miller | 426/316 |
| 3,362,580 | 1/1968 | Chambers | 221/207 |
| 3,443,509 | 5/1969 | Sandy | 99/357 |
| 3,481,100 | 12/1969 | Bergstrom | 426/392 X |
| 3,650,773 | 3/1972 | Bush et al. | 426/383 |
| 3,884,386 | 5/1975 | Ureda | 221/150 R |
| 3,986,759 | 10/1976 | Holstein et al. | 312/265.6 |
| 4,391,080 | 7/1983 | Brody et al. | 426/316 |
| 4,546,901 | 10/1985 | Buttarazzi | 221/123 |
| 4,762,250 | 8/1988 | Friberg | 221/123 |
| 4,762,483 | 8/1988 | Zevlakis | 425/140 |
| 4,787,533 | 11/1988 | Haroutel et al. | 221/123 |
| 4,868,951 | 9/1989 | Akesson et al. | 83/367 |
| 4,920,764 | 5/1990 | Martin | 221/150 R |
| 5,025,950 | 6/1991 | Trouteaud et al. | 221/150 R |
| 5,097,986 | 3/1992 | Domberg et al. | 221/150 R |

FOREIGN PATENT DOCUMENTS

| | | |
|---|---|---|
| 110085 | 10/1983 | European Pat. Off. . |
| 169118 | 6/1985 | European Pat. Off. . |
| 2459637 | 6/1979 | France . |

Primary Examiner—Donald E. Czaja
Assistant Examiner—Milton I. Cano
Attorney, Agent, or Firm—St. Onge Steward Johnston & Reens

[57] ABSTRACT

A method for conditioned storage and sale of perishable foodstuffs (A), such as for example meat delicacies, to be sold in portions comprises a display cabinet (2,3) containing a refrigerated and protective atmosphere. Pallets (7) are provided for arranging the foodstuffs (A). There is an operating panel (5) for selecting a desired foodstuff and for activating a control system. A slicer (9) is adapted to take a portion from the selected foodstuff (A) under control of the control system. A conveyor enables the automatic dispense of the sliced-off foodstuff.

9 Claims, 7 Drawing Sheets

METHOD FOR CONDITIONED STORAGE AND SALE OF PERISHABLE FOODSTUFFS

This is a continuation of copending application Ser. No. 07/740,811, filed on Aug. 6, 1991, now abandoned.

The invention relates to an apparatus for conditioned storage and sale of perishable foodstuffs, such as for example meat delicacies, to be sold in portions.

In grocery stores and supermarkets it is customary to display meat delicacies and the like in refrigerated display cases. If the customer has placed an order for a certain product, the shop assistant takes it from the display case and places it on the slicer. A required quantity is sliced off and is weighed on a weighing machine. As the desired quantity has been sliced off, the product is replaced again in the display case. The sliced off product is packed and priced and is handed over to the customer. This is repetitive manual work which is often slow thereby requiring a lot of personnel and/or causing queues in the shop at peak hours. An important disadvantage is furthermore that the hygiene cannot be guaranteed as the shop assistants often touch the products with their hands. A further disadvantage is that selling these products requires a lot of floor space. Beside meat delicacies, also salads and cheese and for instance meal components are displayed and delivered to customers in the described manner. Similar problems arise with these products.

It is an object of the invention to provide an apparatus of the type mentioned in the preamble, wherein said problems are removed in an effective way.

For this purpose the apparatus according to the invention is characterized by means for arranging the foodstuffs, means for selecting a desired foodstuff and for activating a control system, means for taking a portion from the selected foodstuff under control of the control system, and means for automatically dispensing the taken foodstuff.

With this apparatus according to the invention it is possible to take off a portion from a foodstuff stored in a larger unit and to dispense it to the customer without intervention of shop personnel. As a result it is possible to obtain a hygienic handling of the foodstuffs. Also a substantial saving on personnel cost is obtainable in this manner, and this apparatus also requires less floor space since there is no need anymore for work space for the personnel.

Preferably the apparatus includes a display cabinet as means for arranging the foodstuffs, as in that case the customer is enabled to visually judge and select the product. Of course this is not strictly necessary and the foodstuffs may also be stored invisible for the customers which, in that case, may select on the basis of only the name or an illustration of the product.

The apparatus preferably includes pallets on each of which one of the foodstuffs or a container for the foodstuffs is attached and which are movable within the apparatus and are controlled by the control system such that the take off side of each foodstuff and the take off means are adapted to be positioned relative to each other.

In this manner the pallets can be used for moving the foodstuff attached thereto within the apparatus by means of, for example, an automatic manipulating or displacement system to the means for taking a portion therefrom and returning it to a storage position. It should be insured then that, by means of the control system, the take off position of the foodstuff, which changes during take off, is positioned every time in the right way with respect to the take off means. This is for instance possible by means of a memory in the control system, in which it is stored where the respective foodstuff was positioned during the preceding take off. Sensors could also be used for this purpose. According to the invention it is preferred, however, to bring the means for taking a portion from the foodstuffs, which could for instance consist of a slicer or take off machine, to the substantially stationary foodstuffs. A further possibility is to arrange several foodstuffs onto one or a plurality of turntables or conveyor belts on the perimeter of which one or more slicers are positioned. When a portion of a particular foodstuff is sliced off or is taken off in another way, this foodstuff may then be displaced outwardly one way or another in order to be sliced again.

As mentioned before, the means for taking a portion from one of the foodstuffs may consist of a slicer with which slices may be sliced from meat delicacies or cheese, for example. In case of salads or cut or treated vegetables and fruit other means should be chosen, such as for instance scoop, grip or push-out means or a valve means in case of liquids.

In a very convenient embodiment, the means for selecting the desired foodstuff includes an operating panel for selecting the quantity and/or quality of the portion to be taken from the foodstuffs.

Due to this feature the customer may select, for example by means of push buttons on the operating panel, the desired foodstuff, as well as the quantity thereof and possibly also the slice thickness or the like.

To determine the quantity of the respective foodstuff desired by the customer, the apparatus according to the invention may include a weighing machine which is adapted to weigh the removed quantity of foodstuff, or possibly also the reduction of the weight of the stored foodstuff unit of which a portion is taken off, and in this manner it is possible to control the slicing machine.

On the other hand, the computer of the control system may contain such information that in the example of meat delicacies, the control system knows, on the basis of the former use, the weight of a slice of a certain thickness of a particular foodstuff so that a number of these slices precisely results in the desired weight. It is also possible for the customer to enter the number of slices and the total weight desired.

As advantageous for the development of the apparatus, the means for dispensing the portion taken from the foodstuff may include a packing machine and possibly also a pricing machine permitting the dispense to the customer of a packed and priced or coded quantity of the selected product. A further development could include an automatic paying machine so that the customer pays directly to the apparatus. A memory may count the quantities of the various products dispensed and the amount of money received for it.

To store the foodstuff units in the apparatus under favourable conditions, the foodstuffs may be surrounded separately or in common by a protective atmosphere. Due to such controlled environment for the foodstuffs in connection with its processing without human intervention, the foodstuffs may be kept bacteriologically clean and resist taint better. The protective atmosphere may for instance include nitrogen, carbon-dioxide, alcohols or such organic substances. A protection by enzyms or yeasts may also be used.

In this case it is possible that there is arranged an airlock between a portion of the apparatus containing the protective atmosphere and the environment for dispensing therethrough the portion taken from the foodstuffs. The slicer or the like may be arranged outside, but preferably inside the portion containing the protective atmosphere.

The apparatus may further be equipped with means for automatically cleaning the apparatus, and in particular its take off means, such as the slicer. These cleaning means could for example consist of spray nozzles for spray cleaning parts and/or members for removing slicing remains or the like.

The apparatus could also comprise signal means indicating the exhaustion of a foodstuff.

The pallets for receiving the foodstuffs can preferably be designed such that the pallets are filled by the foodstuff manufacturer and are so delivered to the shop and are returned to the manufacturer after use.

From the foregoing it will be clear that the invention provides an apparatus with which a perishable foodstuff protectively stored therein as a large piece or in a large container, such as meat delicacies, cheese, salads, pretreated vegetables or the like, may in accordance with the selection of a customer, take off a portion by slicing or removal from the supplies, determine the required quantity thereof, pack and possibly price it and dispense it to the customer in a fully automatic and hygienic way.

The invention will hereafter be elucidated with reference to the drawing schematically showing embodiments of the invention by way of example.

Figure 1:
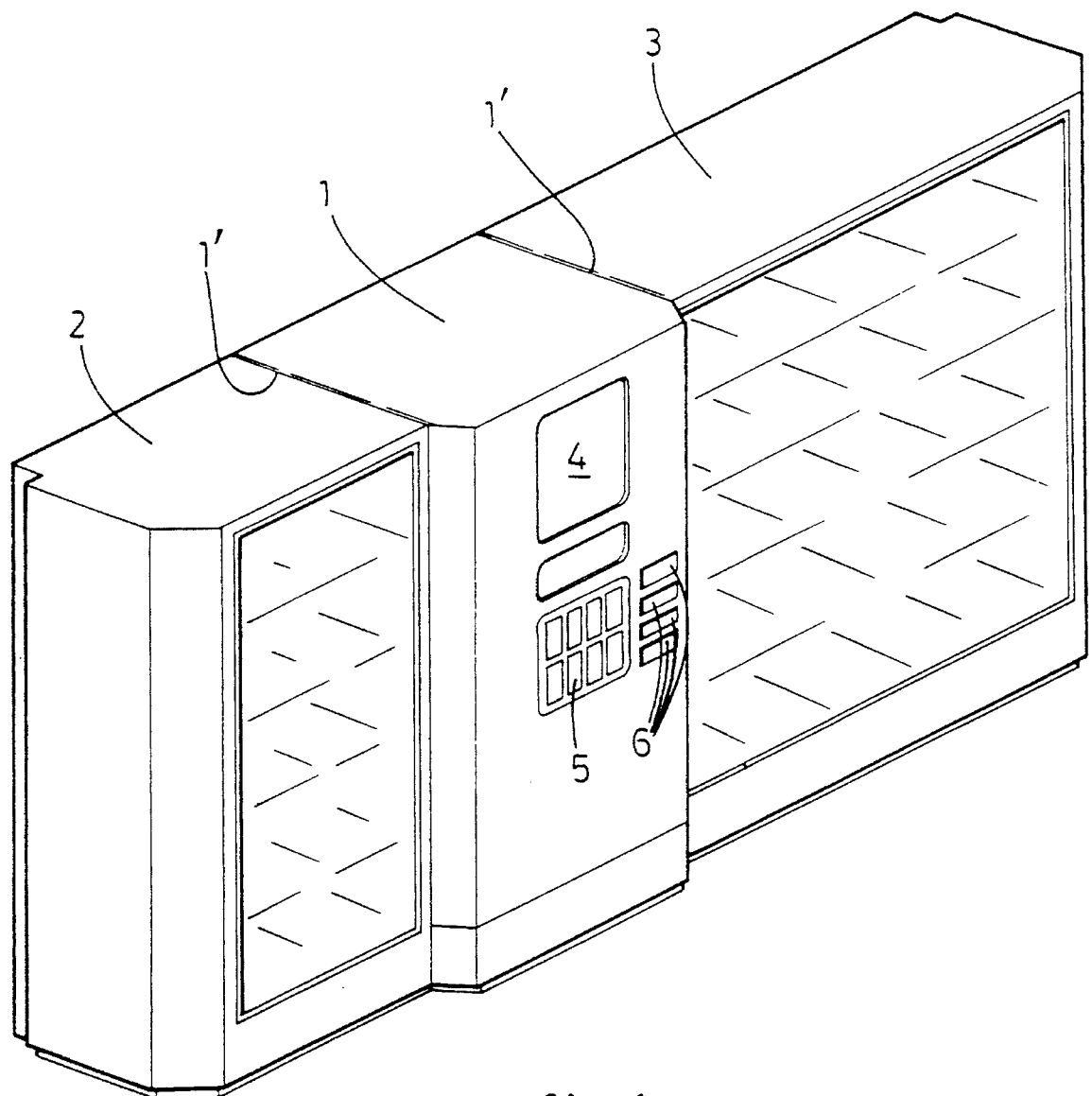
FIG. 1 is a perspective view of an apparatus for conditioned storage and sale of perishable foodstuffs.

The drawing—and first of all FIG. 1—shows an apparatus to be used in a shop, canteen or the like, for conditioned storage and sale of perishable foodstuffs, such as meat delicacies, salads, vegetables, fruit and alike, which may be taken off in portions as desired.

The apparatus comprises a central unit 1 on either side of which a display cabinet 2 and 3, respectively, are coupled in an exchangeable manner by means of couplings 1'. The display cabinets 2 and 3 may be made in different sizes and may be selected in accordance with the turnover of a shop and be coupled to the central unit. The central unit 1 may be the same for all cases. The display cabinets 2 and 3 preferably contain a refrigerated and protective atmosphere in order to be able to store the foodstuffs, which are displayed in a manner to be indicated further on, also for a longer period of time. The central unit 1 may comprise a display unit 4 to show information and an operating panel 5 to allow customers to enter data for selecting the desired product in the desired quantity. Instead of an operating panel 5 it is also possible to provide for a hand-held remote control. This remote control may include a scanner adapted to read a code associated with the product enabling the selection of the product in this manner. The central unit 1 may further comprise openings 6 for which the selected foodstuffs may be dispensed in order to be taken out by the customer. Alternatively it is possible to convey the selected foodstuffs to a check-out where the packed foodstuffs are handed over after payment thereof.

Figure 2:
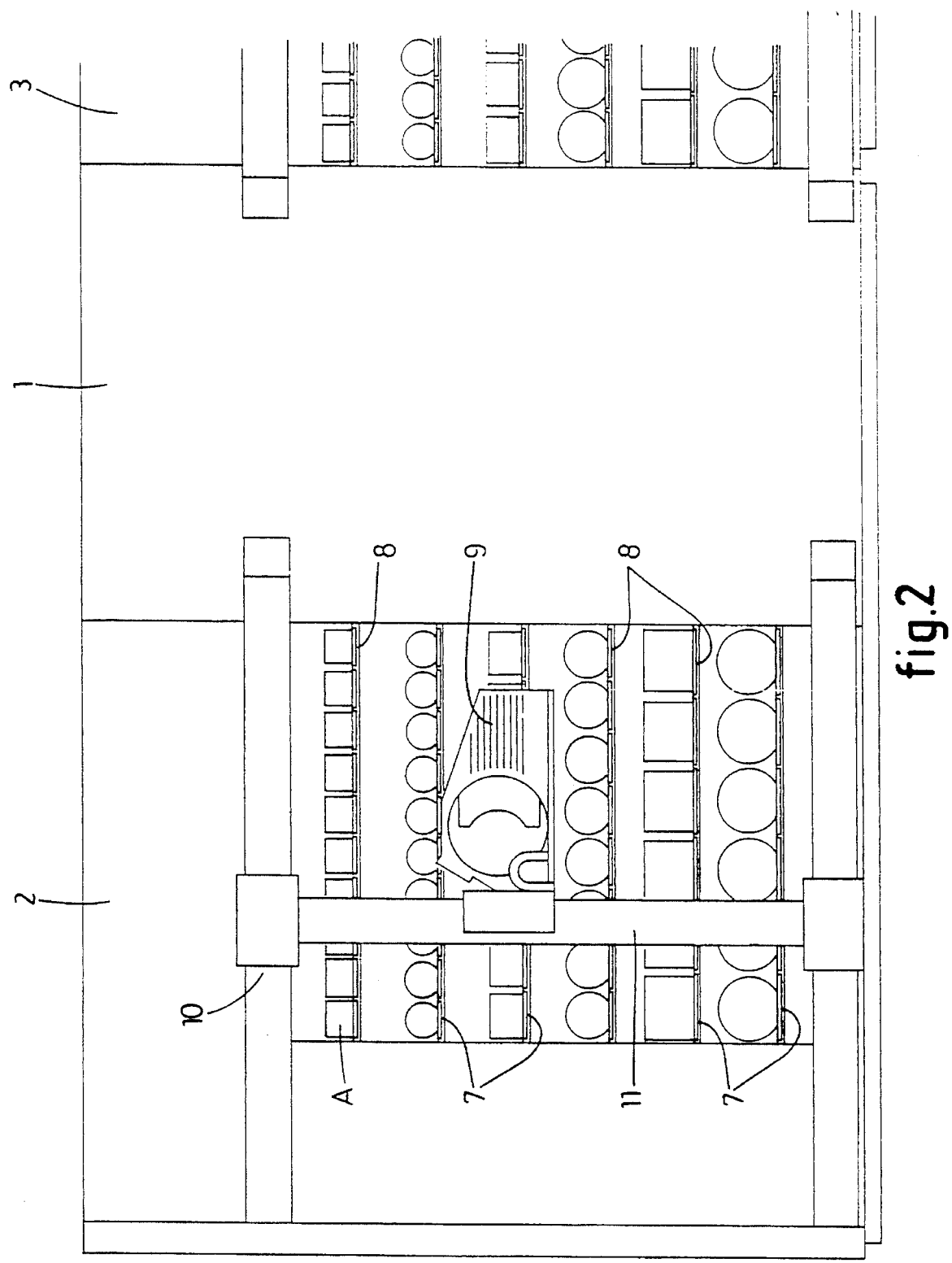
FIG. 2 is a front sectional view of the apparatus of FIG. 1.

FIG. 2 shows in particular the interior of the display cabinet 2 and it can be seen that a large number of foodstuffs A are each positioned on their own pallet 7, said pallets 7 being arranged on shelves 8. A take off means for the foodstuffs A, in this case constructed as slicer 9 for slicing sliceable cheeses and meat delicacies, is movable in horizontal and vertical direction by means of drives (not shown) along straight guides 10 and 11, respectively, in order to be brought to selected foodstuff A and to further convey the foodstuff taken off for dispense, if desired. The movements of the slicer 9 may be controlled by means of a control system of which the computer part is accommodated within the central unit 1.

Figure 3:
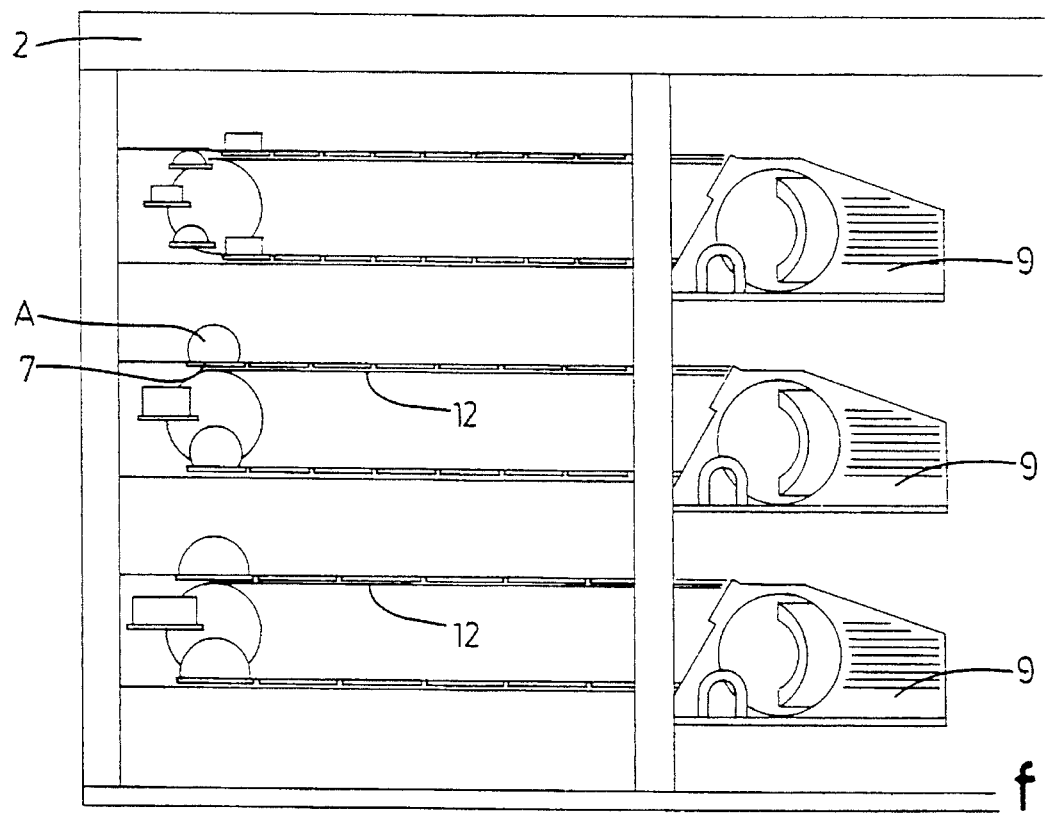
FIG. 3 is a front sectional view of an alternative embodiment of the apparatus according to the invention.

FIG. 3 shows an alternative embodiment for a system to bring the foodstuffs A and the slicer 9 towards each other. In this case there are provided three slicers 9, while the pallets 7 for the foodstuffs A are positioned on an endless conveying means 12 adapted to circulate under control of the control system and to bring the pallet 7 carrying the selected foodstuff A to the slicer in order to have the selected portion of the foodstuff A removed. The pallets 7 are attached to the conveying means 12 in such a manner that the pallets 7 remain horizontal during the whole circulation.

Figure 4:
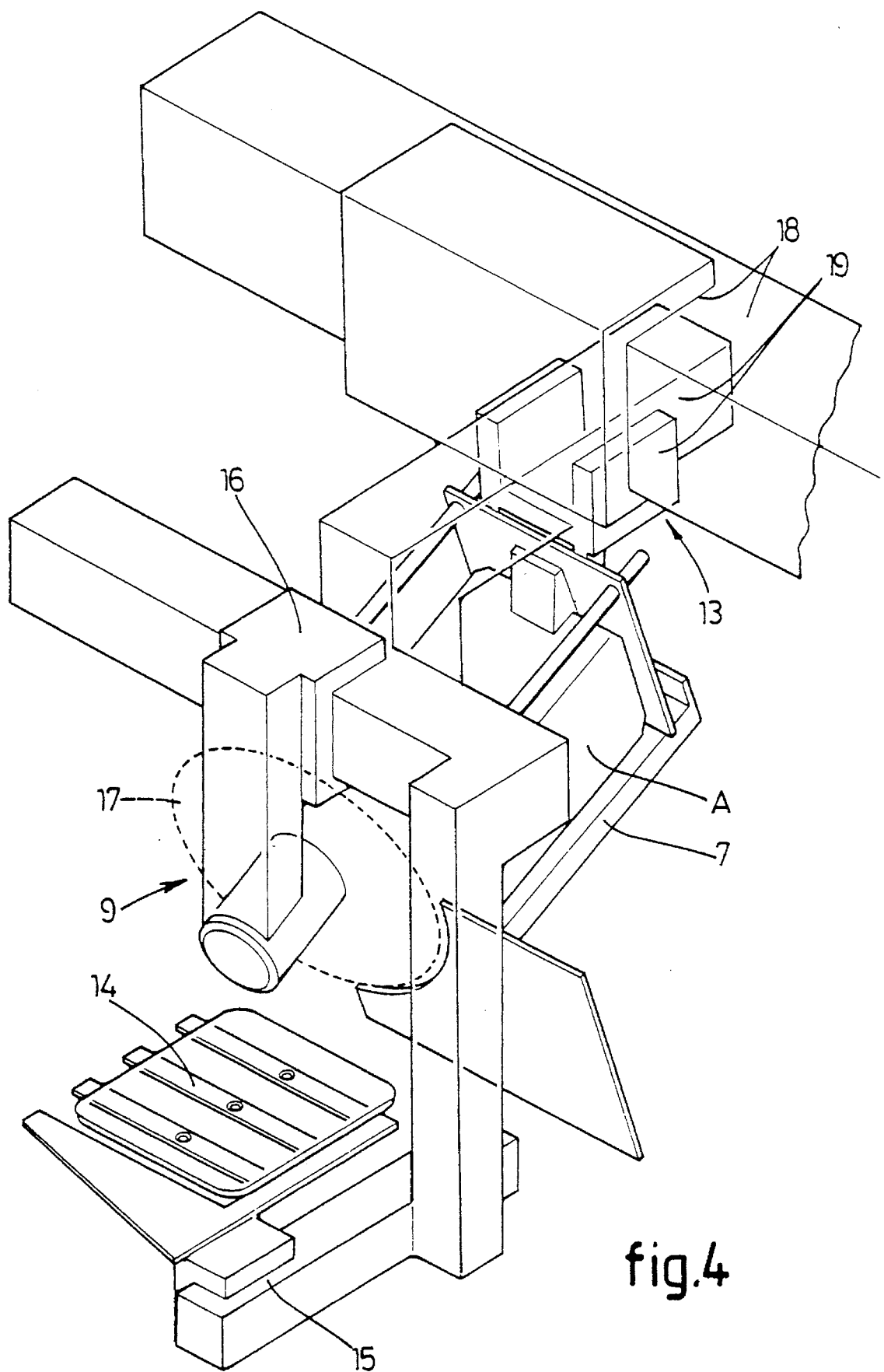
FIG. 4 is a perspective, partional view of the apparatus of FIG. 1, illustrating the operation of the slicer thereof.

FIG. 4 shows in more detail a slicer for use in the display cabinet of FIG. 2. The slicer 9 co-operates with a tilting device 13 adapted to engage one of the pallets 7 and to take it to a tilted position in order to cut slices from the foodstuff A that is positioned on the pallet 7. This tilted position of the foodstuff A has the advantage that cut slices which fall down will automatically be dropped in a correct and predictable manner when they are received. This receipt occurs with a tray or the like (not shown) which should be placed onto a weighing machine 14 integrated in the slicer 9. The weighing machine 14 may be incorporated in the control system of the apparatus in order to determine whether the required quantity of foodstuff A is taken off. The weighing machine 14 may be slidable with respect to the slicer 9 by means of a horizontal straight guide 15 in order to be displaced in steps after cutting each successive slice to receive the cut-off slices in an offset relationship within the packing. The slicer 9, in this case, comprises a rotatable slicing knife 17 adapted to reciprocate along a straight guide 16 by means of a drive (not shown) in order to cut the slices. Straight guides 18 and 19 permit further manipulating movements of the slicer 9 and the tilting device 13.

Figure 5:
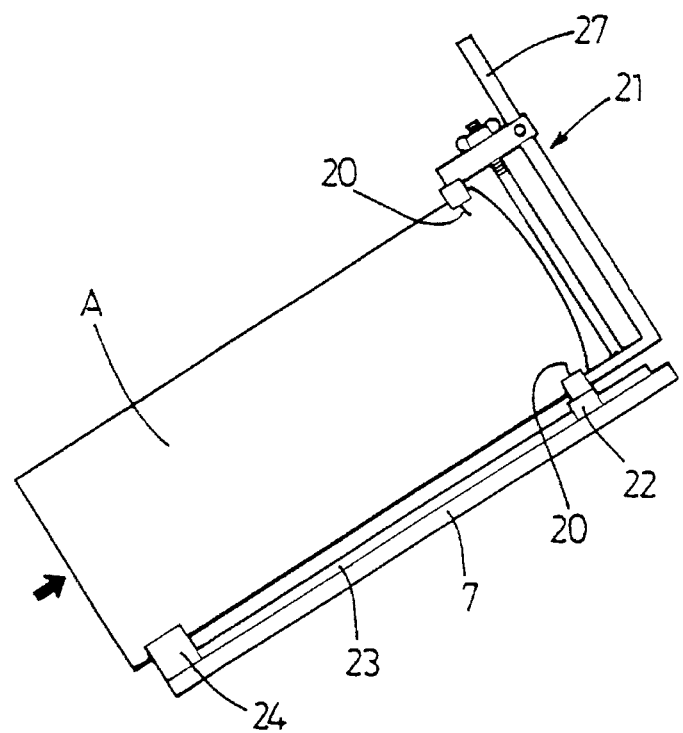
FIG. 5 is a side view of a meat delicacies pallet for use in the apparatus according to the invention.

FIG. 5 shows a possible embodiment of a pallet 7 having means for slidably holding the foodstuff A thereon. In this case, the foodstuff A is held near its rear end by means of a clamping device 21 carrying hooks 20. The clamping device 21 is provided on a slide 22 which is adapted to slide on rails 23 on the pallet 7. Near the front end of the pallet 7, that is at the end of the foodstuff A where the slices should be taken off, there are arranged support means 24 for the foodstuff A in order to permit the foodstuff A to slide. If it is necessary to support a foodstuff A which does not have a constant cross-sectional area, measures could be taken to ensure nevertheless that the sliced face of the foodstuff A is kept perpendicular to the pallet 7 when the foodstuff A is slid.

Figure 6:
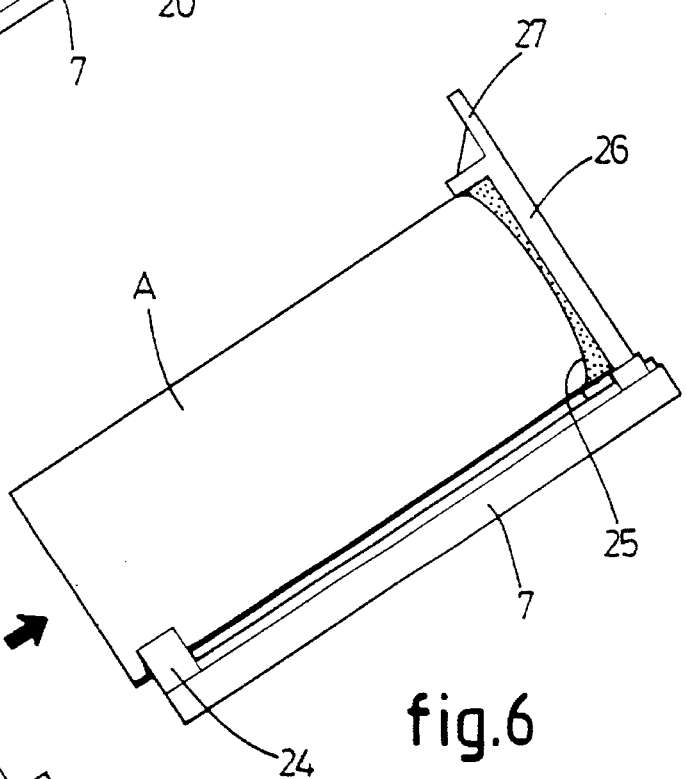
FIG. 6 shows an alternative embodiment of the meat delicacies pallets of FIG. 5.
Figure 7:
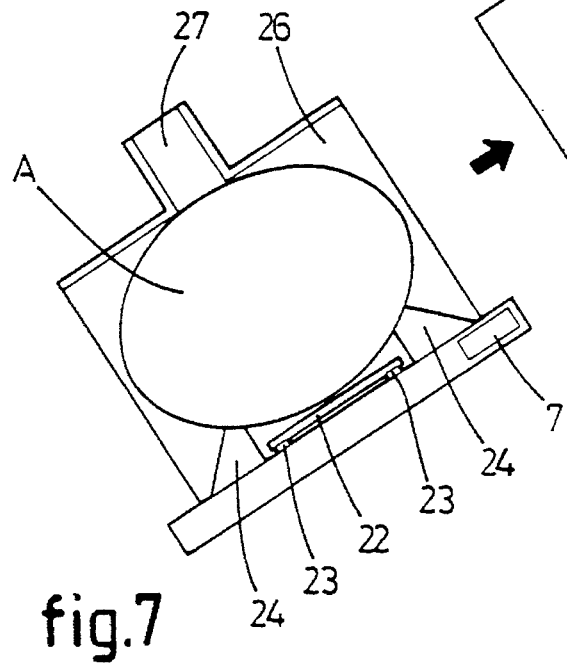
FIG. 7 is a front view of the meat delicacies pallets of FIG. 6.

FIG. 6 and 7 show alternative means to attach the foodstuff A on the pallet 7. In this case the foodstuff A is attached with its rear end to a support 26 by means of an eatable jelly 25, said support 26 is mounted on the slide 22 again. An outwardly protecting part 27 of the support 26 serves for the engagement of a tilting or manipulating device. Such part 27 may also be provided in the clamping device 21 of FIG. 5.

Figure 8:
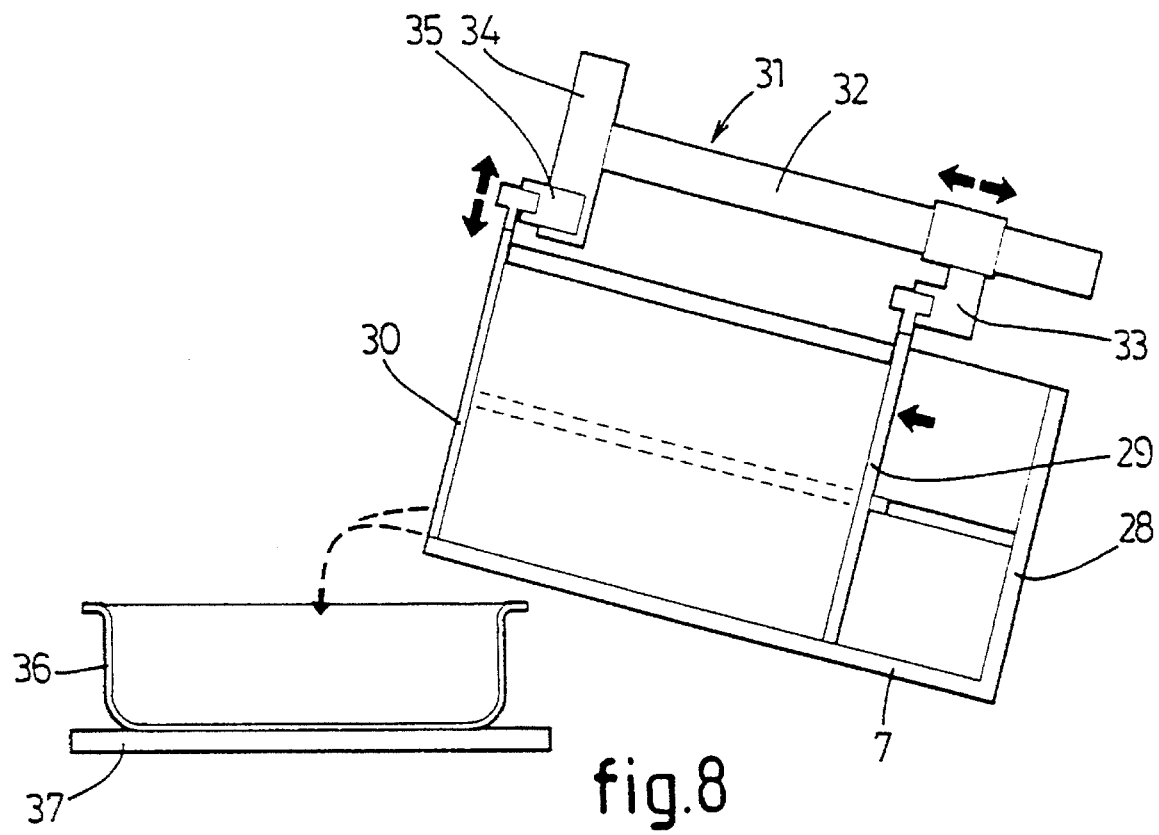
FIG. 8 is a longitudinal sectional view of take off means for loose foodstuffs for use in the apparatus according to the invention.

FIG. 8 shows an alternative embodiment of a pallet 7 which is constructed to receive a plurality of loose foodstuffs, such as for instance cut vegetables, potatoes or the like. For this purpose the pallet 7 is provided with a container 28 having a rear wall 29 which is movable in longitudinal direction of the container 28 and a front wall 30 which is displaceable in vertical direction. These walls 29 and 30 form, together with the manipulating device controlled by the control system, the means for taking a portion from the selected foodstuff A. The manipulating device 31 comprises a gripper 33 displaceable along a straight guide 32 to engage the rear wall 29 and a gripper 35 displaceable along a straight guide 34 to engage the front wall 30 of the container 28. Dependent on the selected quantity of the foodstuff A and dependent on the nature of this foodstuff A, the front wall 30 is moved upwardly by the gripper 35 and the rear wall 29 is displaced by means of the gripper 33 in the direction to the front wall 30 to push the foodstuff A out of the container 28. The pushed-out foodstuff A is received in a tray-shaped packing 36 which is positioned on a platform 37 which can be displaced to a dispensing point by means of devices not shown.

Figure 9:
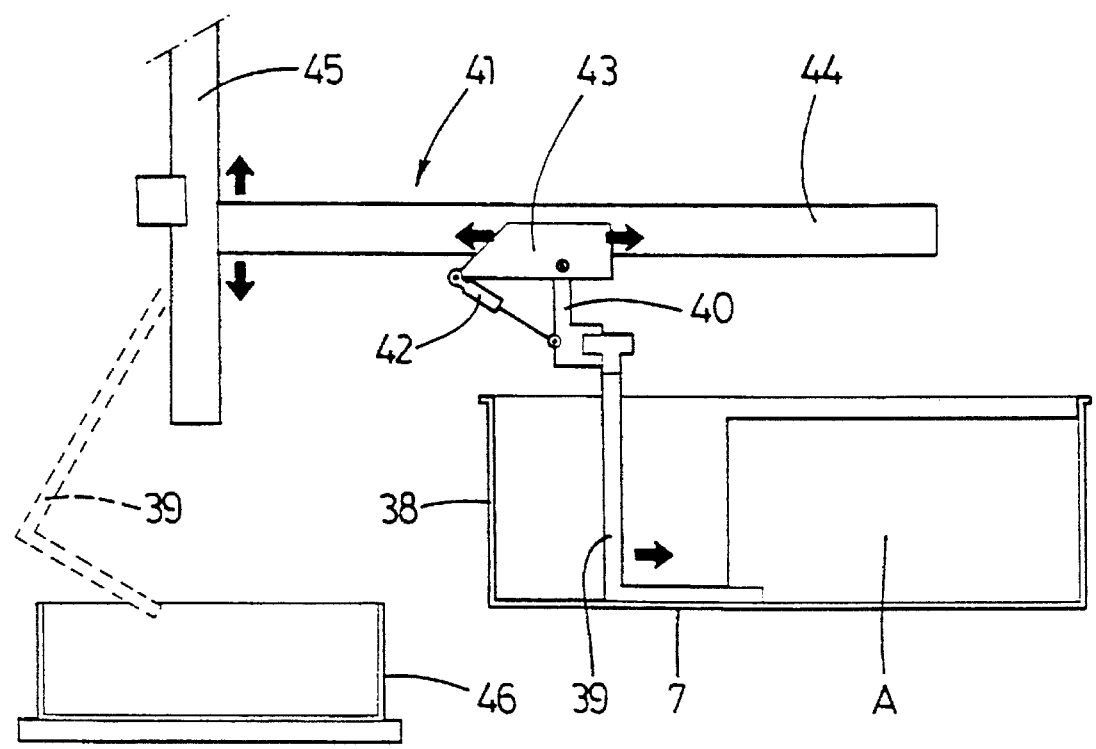
FIG. 9 is a longitudinal sectional view of spoon take off means for scopable foodstuffs for use in the apparatus according to the invention.

FIG. 9 illustrates a further embodiment of the pallet 7 which is adapted to receive scoopable foodstuffs A, such as for instance salads or the like. In this case the pallet is provided with a pro-shaped container 38 and a spoonlike member 39 adapted to be gripped by a gripper 40 of a manipulating device 41. The gripper 40 is suspended from a slide 43 and is tiltable by means of a cylinder-piston assembly 42, such slide being slidable along a straight guide 44 which can be displaced in vertical direction along a straight guide 45. As a result the gripper 40 can be moved so as to cause the spoonlike member 39 to scoop a quantity of foodstuff A and to dispose it into a tray-shaped packing 46. The interrupted lines indicate the scoop like member 39 in its tilted disposing position.

After a packing, for example the tray-shaped packing 36 or 46, has been filled with the required quantity of foodstuff A, it is conveyed by means of a conveying device, such as a conveyor belt, and is passed through a sealing device in which a foil is sealed onto the tray-shaped packing in a manner known per se, for example. Preferably this is carried out in the same protective atmosphere in which also the stored foodstuffs A are positioned so that the sealed packing is automatically filled with protective gas and the foodstuff A is well-protected from deterioration also after it has been packed.

Figure 10:
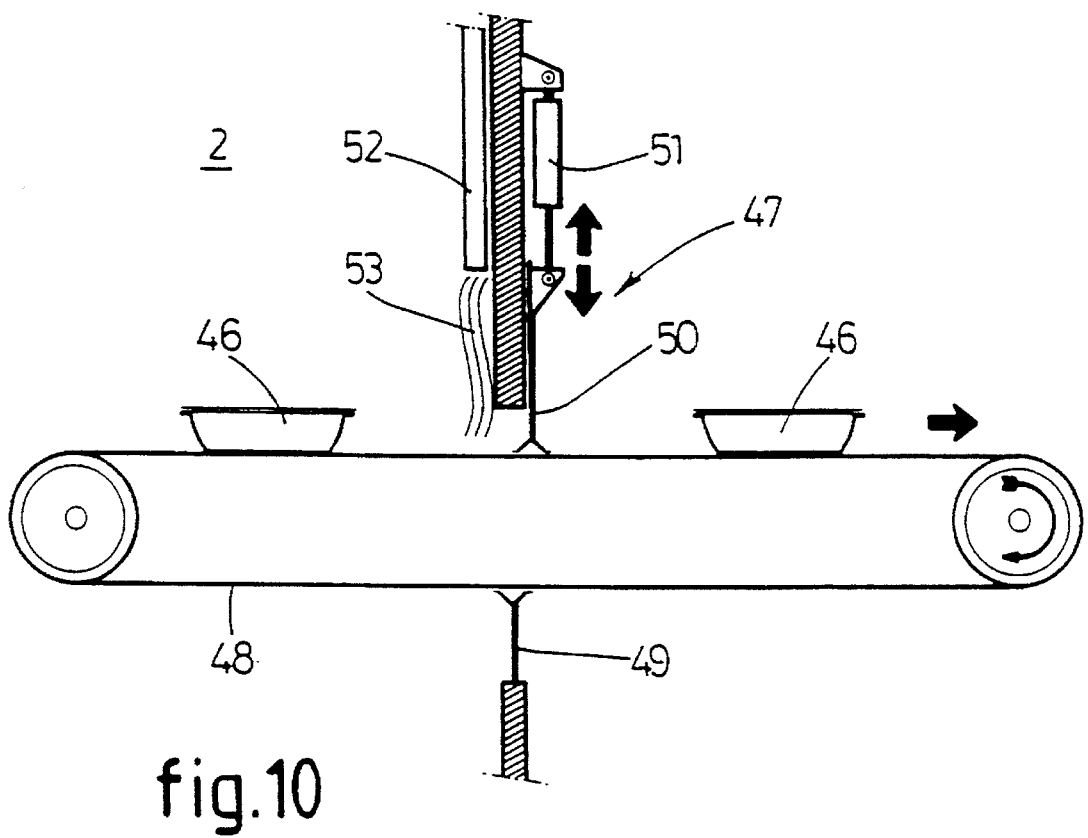
FIG. 10 is a sectional view of an airlock for use in the apparatus according to the invention.

FIG. 10 shows a sectional view of an airlock 47 for the passage of a sealed packing 46 from the protective atmosphere in the display cabinet 2 to the environment. The packings 46 are conveyed through the airlock 47 by means of a conveyor belt 48. The conveyor belt is sealed at its return part by means of a seal 49 and, in closed position of the airlock 47, a seal 50 engages the transport part of the conveyor belt 48. This seal 50 is displaceable in vertical direction by means of a cylinder-piston assembly 51 to permit the passage of a packing 46. A gas blow-out device 52 is adapted to form a curtain 53 of protective gas preventing air from entering the display cabinet 2.

Figure 11:
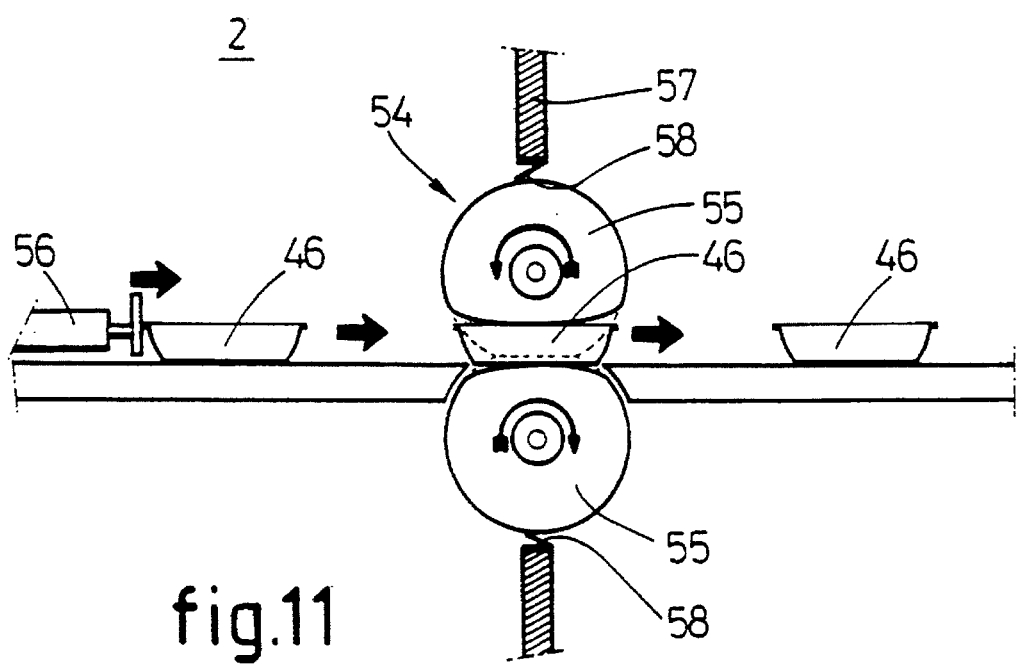
FIG. 11 is a sectional view of an alternative embodiment of the airlock of FIG. 10.

FIG. 11 shows an alternative embodiment of an airlock 54 comprising two driven, deformable cell rubber rollers 55 positioned one on top of the other and in engagement with each other in a sealed manner. A packing 46 is introduced into the nip between the rollers 55 by means of the displacement device 56, whereafter the rollers 55 take over the displacement function of the displacement device 56 and convey the packing 46 in a sealed manner between them to the environment in order to be dispensed there. Between the rollers 55 and the stationary wall 57 of the display cabinet 2 there may be provided seal lips 58.

Figure 12:
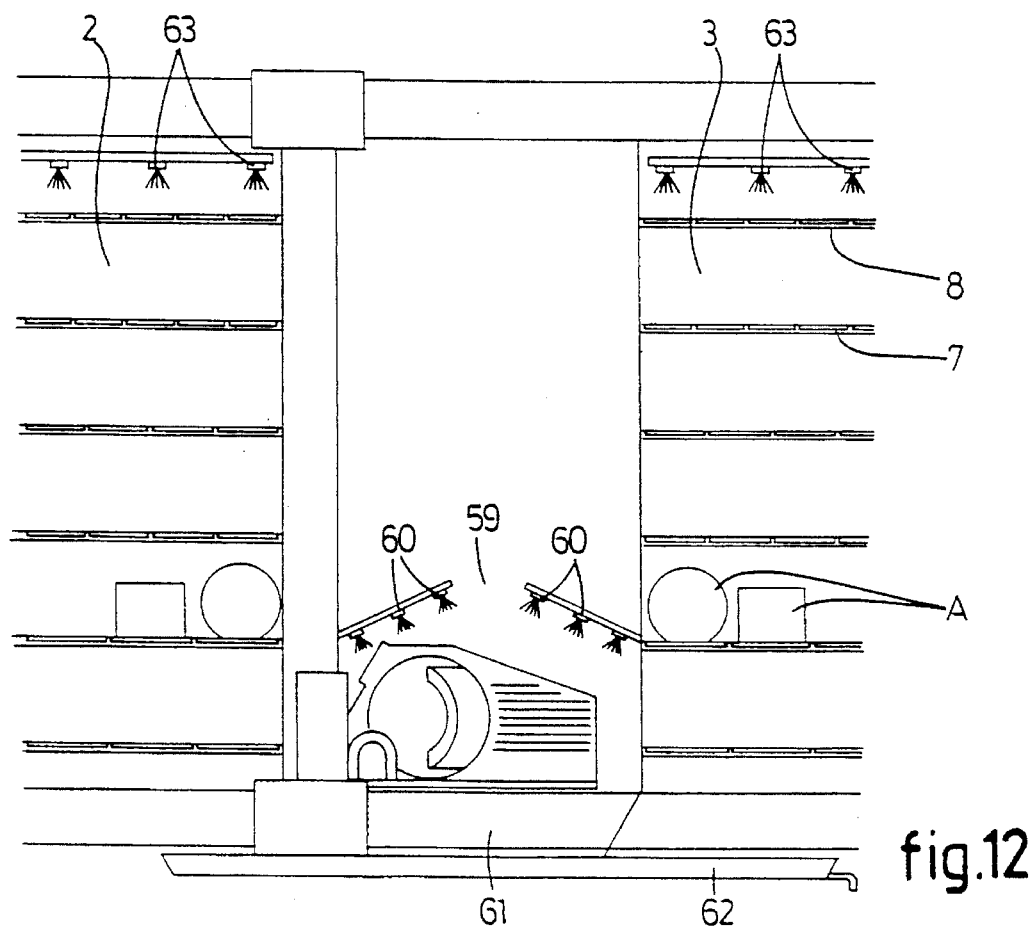
FIG. 12 is a sectional view of a portion of the apparatus according to the invention, illustrating cleaning means.

Finally, FIG. 12 shows a sectional view of the apparatus according to the invention, in which possible embodiments of cleaning means for automatically cleaning parts of the apparatus are shown. These cleaning means comprise a room 59 which may be accommodated in the central unit 1 or in one of the display cabinets 2 or 3, the room 59 being adapted to receive the slicer 9 in order to rinse the slicer 9 by means of spray nozzles 60. The liquid from the spray nozzles 60 is received in a receptacle 61 and is discharged from the apparatus through a discharge line 62. As the room 59 is completely separated from the spaces where the foodstuffs A are arranged, the slicer 9 is permitted to be cleaned without necessitating the removal of the foodstuffs A from the display cabinets 2, 3. To clean the display cabinets 2, 3—after the foodstuffs A are removed therefrom—spray nozzles 63 are arranged within the display cabinets 2,3. The cleaning liquid from these spray nozzles 63 will also be received in the receptacle 61.

The invention is not restricted to the embodiments described herein before, which can be varied in different manners within the scope of the invention.

I claim:

1. A method for storing for sale perishable foodstuffs including meat delicacies to be sold in portions, comprising the steps of:

storing exposed supplies of different perishable foodstuffs in bulk on pallets in predetermined positions within a food protective atmosphere containing a substance selected from the group consisting of nitrogen, carbon dioxide, enzymes and yeasts;

selecting a desired stored foodstuff and selecting a desired quantity to be removed from the selected, desired foodstuff;

removing the desired quantity of foodstuff from the stored bulk thereof within the food protective atmosphere;

generating a price for the desired quantity of foodstuff;

packaging the desired quantity of foodstuff while the foodstuff is inside the food protective atmosphere and;

automatically dispensing the desired quantity of foodstuff from the food protective atmosphere to an ambient environment.

2. The method according to claim 1, and further comprising the step of displaying the bulk foodstuffs from inside the protective atmosphere.

3. A method for storing for sale perishable foodstuffs, including meat delicacies, to be sold in portions, comprising the steps of:

storing foodstuffs in bulk on pallets inside a display enclosure, with the foodstuffs having take off sides from which foodstuff portions can be removed;

positioning a slicer, located inside the display enclosure, and a pallet having a foodstuff relative to each other so that the slicer is in an operable position with respect to the take off side of the foodstuff on the pallet for a removal by the slicer of a desired portion of the foodstuff bulk on the pallet inside the display enclosure; and moving the desired portion to a location external to the display enclosure.

4. The method of claim 3 wherein the storing step comprises supporting a said foodstuff slidingly onto a said pallet.

5. The method of claim 4 wherein the supporting step comprises clamping the foodstuff on a backside which is located opposite to the take off side and while so clamping the foodstuff sliding the foodstuff in the direction of its take off side.

6. The method of claim 3 and further comprising the step of refrigerating the display enclosure while the foodstuff is stored therein and the slicer removes said desired portion.

7. The method as claimed in claim 3 and further comprising the step of remotely controlling the slicer while it is inside the display enclosure to select the quantity of the portions removed from the bulk foodstuff on a pallet.

8. The method as claimed in claim 3 wherein the storing step comprises the step of storing the foodstuffs inside a display cabinet having a protective atmosphere formed of a substance selected from the group consisting of nitrogen, carbon dioxide, enzymes and yeasts.

9. The method as claimed in claim 8 wherein said step of moving the desired portion of the foodstuff comprises the step of moving the desired foodstuff portion through a seal separating the protective atmosphere from ambient air.

\* \* \* \* \*